March 13, 1934.  J. BIJUR  1,950,392
FLOW CONTROL FITTING
Original Filed Aug. 9, 1922
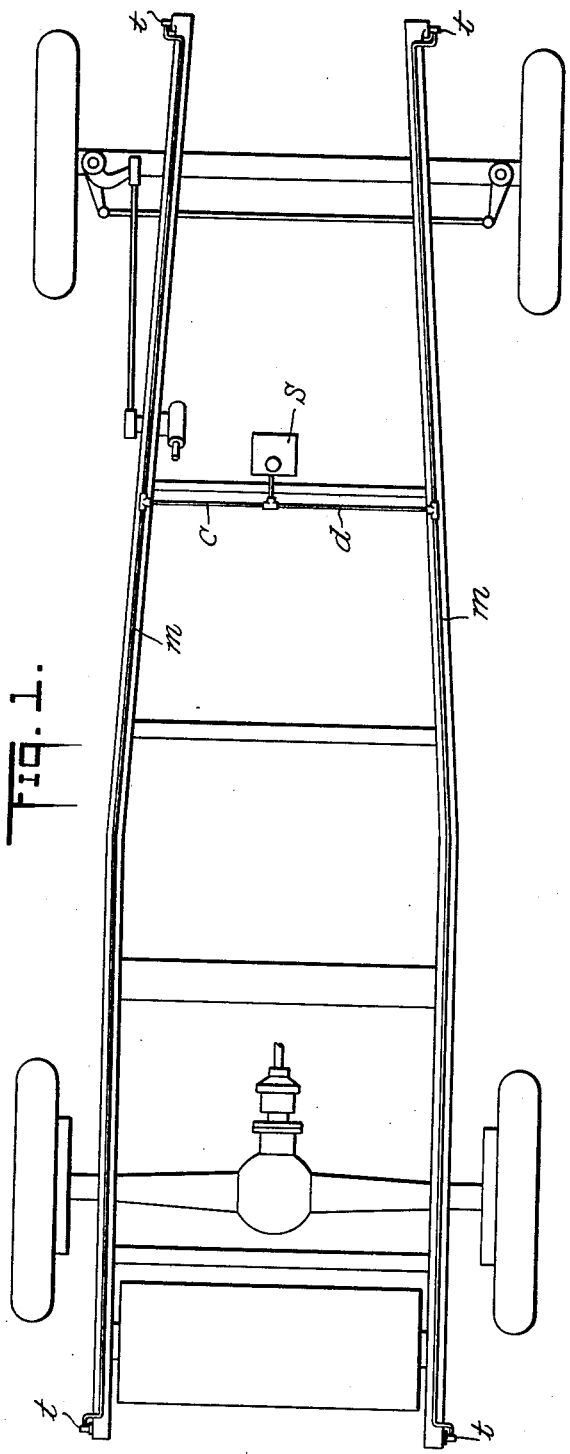
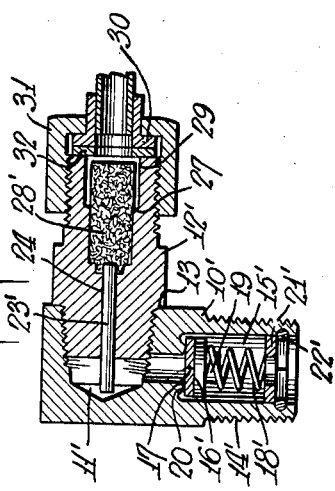
INVENTOR
Joseph Bijur
BY
ATTORNEYS Patented Mar. 13, 1934

1,950,392

UNITED STATES PATENT OFFICE 1,950,392

FLOW CONTROL FITTING

Joseph Bijur, New York, N. Y., assignor to Auto Research Corporation, a corporation of Delaware Original application August 9, 1922, Serial No. 580,668. Divided and application June 5, 1928, Serial No. 282,958, now Patent No. 1,732,828, dated October 22, 1929. Divided and this application September 26, 1929, Serial No. 395,258

13 Claims. (Cl. 184—7)

My present invention relates primarily to chassis lubrication and is more especially concerned with flow control devices of the general type disclosed in my issued Patent No. 1,632,772 of June 14, 1927, and known as "drip plugs", the flow rating of which is not subject to fortuitous variation.

It is an object of the invention to provide a drip plug of the above type of compact construction which is not easily tampered with, but may be conveniently taken apart and put together when desired in the course of manufacture.

Another object is to provide a fitting of the above type, which permits of easily assembling, cleaning or clearing the restriction without interference by the valve.

Another object is to provide a fitting of the said type which permits of testing the valve for tightness without interference from the restriction element.

Another object is to avoid the need for rejecting the entire fitting where only the valve or only the restriction is found defective during the process of manufacture and inspection.

The objects of the invention are accomplished by forming the drip plug of two coacting separable fitting parts, one of which embodies the flow controlling restriction. Preferably, one of the fitting parts has a nipple end adapted to be applied to the bearing, with the outer portion of which fitting part, the coacting inlet fitting part has a plug and socket connection, and to which the feed pipe extremity is connected. The restriction may be a filler of metal or other hard material, within a corresponding bore longitudinally of one of the fitting parts, producing a high resistance crevice of length and cross-section determining a definite rate of flow with oil of a given viscosity, under a given propulsive pressure.

This application is a division of my copending application Serial No. 282,958, filed June 5th, 1928, which has matured into Patent No. 1,732,828 granted October 22, 1929, said application being in turn a division of my application Serial No. 580,668 filed August 9, 1922.

In the accompanying drawing in which is shown one of various possible embodiments of the several features of the invention, Fig. 1 is a diagrammatic view indicating the application of the fitting to a chassis.

Fig. 2 is a transverse sectional view on a larger scale showing the construction of one embodiment of the fitting.

Referring now to the drawing, I have shown diagrammatically the general layout of the chassis of an automobile having a lubricant supply unit S, illustratively on the dashboard. The distributing system includes headers $c$ and $d$, which communicate at their ends with the respective mains $m$ extending the length of the channel frames and feeding various bearings at or near which the drip plug terminals $t$ are applied. These drip plug terminals are usually provided in sets for an automobile chassis, a drip plug of the proper rating being inserted in a socket in the bearing or attached in some other lubricant tight manner to the bearing to be lubricated. The rating of the drip plug depends upon the lubricant requirements of the bearing. Bridging conduits (not shown) are provided leading to similar drip plugs (not shown) at or near the corresponding bearings on other parts of the chassis.

The fitting of Fig. 2 is shown elbow-shaped and comprises a support element 10' provided with a transverse socket 11' into which is threaded an inlet fitting or cartridge 12' which illustratively extends at right angles to the support. The support is formed preferably of square or polygonal stock whereby the end area of shoulder 13 on the cartridge will contact one of the flat sides. The support has a threaded nipple 14' for insertion into a bearing, bolt or other part to be lubricated.

The support element 10' is shown with a bore 15' of large diameter for mounting the disk valve 16' which is preferably of diameter substantially as large as the fitting admits of, which in one embodiment is preferably of diameter no greater than $\frac{3}{16}''$, and is provided with a seating portion 17 of a material which should be yielding to compensate for irregularities in the seat, smooth to seat completely under light pressure, substantially impervious and chemically inert to oil and non-sticking. Among the materials that answer these requirements are horsehide, smooth finished shark skin, smooth cork, a rubber compound vulcanized to withstand oil, one satisfactory commercial form of which is known as "Hippohide", or varnished cambric mounted on a yielding backing of felt, fibre board or the like, and preferably provided with a seating surface of tin foil to prevent the possibility of sticking at the valve seat. A spring 18' coiled at its inner end about a lug 19 on the valve urges the latter against its downwardly facing seat 20, said spring reacting against a perforated plate or polygonal washer 21' held in place in the lower end of the support by a split ring 22'.

In the present embodiment, the flow restriction is disposed in the cartridge fitting. It is illustratively shown as a metallic filler comprising a restriction pin 23' within a corresponding longitudinal bore 24 in the cartridge element. The bore 24 is preferably about 1/16" in diameter and about 1/2" long and the wire plug 23' in the neighborhood of .002" smaller in diameter, leaving a minute restricted annular crevice or passage about the wire affording a permanent high resistance to flow.

The cross-sectional area of the annular crevice, though minute, can be made uniform within very fine limits since it is the differential between the cross-section of a bore and a wire plug both of appreciable dimensions and both of which can be easily formed accurately. Greater difficulty would be encountered in forming accurately a minute aperture to provide the necessary resistance to flow, and such aperture would, moreover, be more easily clogged by a minute solid particle, than the preferred annular crevice.

The inlet end of the cartridge 12 preferably has a socket 27 within which is fitted a felt strainer plug 28' the inner end of which fits snugly therein while the outer end is preferably loose or spaced from the wall of the corresponding socket portion 29 of somewhat enlarged diameter as shown.

The end of the pipe line is connected to the drip plug by a suitable coupling. Illustratively a flanged collar 30 is soldered to the pipe line and clamped against the end of the fitting by a screw cap 31 threaded thereon, an interposed gasket 32 effecting a fluid tight connection.

The restriction pin is held against axial displacement by the strainer plug 28' at one end and the bottom of the socket 11' at the other end.

In operation when the drip plug is subjected to pressure applied to the distributing system shown in Fig. 1, the valve 16 will open after the oil has been forced through the restricted flow controlling crevice defined by pin 23' and bore 24 and the oil emits from the fitting slowly drop by drop its flow rate for a given viscosity and propulsive pressure being determined by the clearance between the pin and its bore.

The drip plug has a fixed resistance to flow determined by pin 23', and maintained invariant by the strainer plug 28' which intercepts any solid particles that might clog the minute crevice or become seated at the valve.

In use, should a fitting be found to flow too freely or too slowly the restriction fitting part i. e. the pin 23', may be readily replaced by one of appropriate rating. The seepage fittings described may be initially set for a fixed resistance thereafter non-adjustable. It will be understood, however, that the fittings may be initially set for different resistances, or may be arranged to be adjusted in use as by providing for varying the effective length of wire plug in the fitting bore.

The illustrated embodiment of the invention presents a compact fitting in which the length even of the mounting nipple 14', that is inserted into the bearing, serves to accommodate some of the flow controlling parts of the drip plug in this instance, the valve and its seating spring. Moreover the elbow shape of the drip plug provides a construction protruding but little from the bearing structure to which it is applied, and when used on an automobile is less likely to be knocked off than if the constituent fitting parts of a similar drip plug were axially aligned. The elbow form moreover presents the advantage that the inlet nipple extends in the general direction in which the feed pipe is ordinarily disposed so that the length of the latter need not be bent at a sharp angle for application of the coupling.

The drip plug is readily installed at the bearings as a complete preassembled unit. Each bearing when equipped with a drip plug of appropriate rating will receive an accurately predetermined proportion of the output fed from a common source of lubricant and pressure, and this substantially regardless of the viscosity or fluidity of the lubricant. Each drip plug will respond promptly to the application of pressure to the feed pipe line, and the valve thereof will close promptly to arrest flow or leak upon the discontinuance of operating pressure.

In installing the drip plug or removing it from a bearing it is the polygonal stem or base section which is naturally grasped so that there is no likelihood in such operation of inadvertently disassembling the drip plug, and deliberate separation of the fitting elements with the ordinary tools available to an inexpert layman is difficult. The manufacturer however can readily separate these parts and put them together again when desired, in the course of manufacture.

The two-part arrangement of drip plug facilities manufacture and permits of cleaning or clearing the restriction in its distinct fitting part prior to assembly with the other fitting part, both ends of the restriction being at that time exposed, to permit ejection of chips. The valve also may be tested for tightness in its distinct fitting element without interference from the restriction. By this arrangement the losses due to rejections are reduced to the utmost, because a defect in one element does not involve rejection of the other element.

I claim:

1. A drip plug comprising a support fitting having a nipple adapted to be applied to a bearing, a valve in said support fitting having part of the structure thereof extending into a corresponding bore in said nipple, and an inlet fitting having a plug and socket connection with the outer part of said support fitting, said inlet fitting having an annular flow restriction passage therein.

2. A drip plug construction comprising a fitting adapted to be threaded into a bearing and having a laterally extending socket therein, a second fitting threaded into said socket and having means at the end thereof for application of a feed pipe thereto, a restriction pin in the latter of said members retained by the bottom of said socket, and a spring-seated valve in the first of said members.

3. A drip plug construction comprising a fitting adapted to be threaded into a bearing and having a laterally extending socket therein, a second fitting threaded into said socket and having means at the end for application of a feed pipe thereto, a restriction pin in the second fitting retained by the bottom of said socket, a spring-seated valve in the first of said fittings, and a strainer at the inlet of said second fitting to protect the restriction and the valve, and serving as a stop for the restriction pin.

4. A drip plug comprising a fitting member adapted to be threaded into a bearing, said fitting having a valve seat, a valve and a coil spring urging said valve against said seat; and a second fitting extending at right angles to said first fitting and having a threaded plug and socket connection therewith and a loose restriction pin axially of said second fitting bottoming in said first fitting.

5. A drip plug comprising a fitting member adapted to be threaded into a bearing, said fitting having a valve seat, a valve and a coil spring urging said valve against said seat; and a second fitting extending at right angles to said first fitting and having a threaded plug and socket connection therewith, a loose restriction pin axially of said second fitting bottoming in said first fitting and a strainer member in the inlet thereof.

6. A drip plug comprising a fitting member adapted to be threaded into a bearing, said fitting having a valve seat, a valve and a coil spring urging said valve against said seat; a second fitting extending at right angles to said first fitting, having a threaded plug and socket connection therewith, a loose restriction pin axially thereof bottoming in said first fitting and a strainer member in the inlet thereof, the inlet end of said second fitting being threaded to enable attachment of a compression coupling connection for a pipe end.

7. In a central lubricating installation for a mechanism having a plurality of spaced bearings to be lubricated, said system being of the type including a central reservoir, a central pump receiving lubricant from said reservoir, a branched conduit system with an inlet receiving lubricant from said pump and with a plurality of outlets, one to each bearing, each outlet containing a drip plug terminal unit, said units proportioning the lubricant among the bearings in accordance with their diverse requirements; each drip plug having a metal body with inlet and outlet openings respectively connected to the conduit system and to the bearing, a valve chamber and a bore passing from said inlet to said outlet opening and through said valve chamber, metering restriction means in said bore, said valve chamber being provided at one side thereof with a valve seat and being also provided with a flat flexible valve having a seating facing including a metal foil of smoothness to seat completely under light pressure, softness to conform to the valve seat under seating pressure, and being substantially impervious and chemically inert to oil and non-sticking, and so constructed and arranged within said terminal as to be resiliently urged against said seat.

8. In a central lubricating installation for a mechanism having a plurality of spaced bearings to be lubricated, said system being of the type including a central reservoir, a central pump receiving lubricant from said reservoir, a branched conduit system with an inlet receiving lubricant from said pump and with a plurality of outlets, one to each bearing, each outlet containing a drip plug terminal unit, said units proportioning the lubricant among the bearings in accordance with their diverse requirements; each drip plug having a metal body with inlet and outlet openings respectively connected to the conduit system and to the bearing, a valve chamber and a bore passing from said inlet to said outlet opening and through said valve chamber, metering restriction means in said bore, said valve chamber being provided at one side thereof with a valve seat and being also provided with a flat flexible valve having a seating facing including tin foil of smoothness to seat completely under light pressure, softness to conform to the valve seat under seating pressure, and being substantially impervious and chemically inert to oil and non-sticking, and so constructed and arranged within said terminal as to be resiliently urged against said seat.

9. In a central lubricating installation for a mechanism having a plurality of spaced bearings to be lubricated, said system being of the type including a central reservoir, a central pump receiving lubricant from said reservoir, a branched conduit system with an inlet receiving lubricant from said pump and with a plurality of outlets, one to each bearing, each outlet containing a drip plug terminal unit, said units proportioning the lubricant among the bearings in accordance with their diverse requirements; each drip plug having a metal body with inlet and outlet openings respectively connected to the conduit system and to the bearing, a valve chamber and a bore passing from said inlet to said outlet opening and through said valve chamber, metering restriction means in said bore, said valve chamber being provided at one side thereof with a valve seat and being also provided with a flat flexible valve having a seating facing including an animal skin of smoothness to seat completely under light pressure, softness to conform to the valve seat under seating pressure, and being substantially impervious and chemically inert to oil and non-sticking, and so constructed and arranged within said terminal as to be resiliently urged against said seat.

10. In a central lubricating installation for a mechanism having a plurality of spaced bearings to be lubricated, said system being of the type including a central reservoir, a central pump receiving lubricant from said reservoir, a branched conduit system with an inlet receiving lubricant from said pump and with a plurality of outlets, one to each bearing, each outlet containing a drip plug terminal unit, said units proportioning the lubricant among the bearings in accordance with their diverse requirements; each drip plug having a metal body with inlet and outlet openings respectively connected to the conduit system and to the bearing, a valve chamber and a bore passing from said inlet to said outlet opening and through said valve chamber, metering restriction means in said bore, said valve chamber being provided at one side thereof with a valve seat and being also provided with a flat flexible valve having a seating facing including smooth finished shark skin of smoothness to seat completely under light pressure, softness to conform to the valve seat under seating pressure, and being substantially impervious and chemically inert to oil and non-sticking, and so constructed and arranged within said terminal resiliently urged against said seat.

11. In a central lubricating installation for a mechanism having a plurality of spaced bearings to be lubricated, said system being of the type including a central reservoir, a central pump receiving lubricant from said reservoir, a branched conduit system with an inlet receiving lubricant from said pump and with a plurality of outlets, one to each bearing, each outlet containing a drip plug terminal unit, said units proportioning the lubricant among the bearings in accordance with their diverse requirements; each drip plug having a metal body with inlet and outlet openings respectively connected to the conduit system and to the bearing, a valve chamber and a bore passing from said inlet to said outlet opening and through said valve chamber, metering restriction means in said bore, said valve chamber being provided at one side thereof with a valve seat and being also provided with a flat flexible valve having a seating facing including cork of smoothness to seat completely under light pressure, softness to conform to the valve seat under seating pressure, and being substantially impervious and chemically inert to oil and non-sticking, and so constructed and arranged within said terminal as to be resiliently urged against said seat.

12. A drip plug having a longitudinal bore therein, a rigid pin loosely filling said bore with a minute clearance offering a high resistance to flow, a strainer in a corresponding socket at the inlet end of said fitting, a check valve arrangement at the other end of said fitting, said plug and valve arrangement also serving as stops to prevent the loose restriction pin from moving out of place, said fitting being of two part construction and adapted to disassembly between said strainer and valve arrangement for removal and replacement of said pin.

13. A drip plug comprising a pipe fitting arrangement having one end adapted to be applied at a bearing, and another end to protrude from the bearing and serving for application of a feed pipe thereto, said drip plug having a restriction passage therethrough of length considerably greater than its width, and a resiliently seated valve having a diameter which is a large fraction of that of said fitting piece, said valve having yielding non-sticking seating facing, said arrangement being provided with an enlarged chamber receiving lubricant from said passage and feeding it to said valve.

JOSEPH BIJUR.